United States Patent
Chung et al.

[11] Patent Number: 6,023,967
[45] Date of Patent: Feb. 15, 2000

[54] METHOD FOR MEASURING TIRE WEAR USING INTENSITY OF REFLECTED LIGHT

[75] Inventors: Seong-Ryong Chung; Kun-Sang Lee, both of Kwangju, Rep. of Korea

[73] Assignee: Kumho Tire Co., Ltd., Seoul, Rep. of Korea

[21] Appl. No.: 08/948,303

[22] Filed: Oct. 10, 1997

[30] Foreign Application Priority Data

Oct. 14, 1996 [KR] Rep. of Korea ............ 96/45664

[51] Int. Cl.⁷ ............................................. G01M 17/02
[52] U.S. Cl. ............................................. 73/146
[58] Field of Search ............................................. 73/146

[56] References Cited

U.S. PATENT DOCUMENTS 5,088,321  2/1992  Kajikawa et al. .................. 73/146

FOREIGN PATENT DOCUMENTS 8-29296    2/1996   Japan .
2232492A  12/1990   United Kingdom .

*Primary Examiner*—Joseph L. Felber
*Attorney, Agent, or Firm*—Lowe Hauptman Gopstein Gilman & Berner

[57] ABSTRACT

A method of testing wear of tires is presented. It comprises applying a single layer of reflective paint to a tread surface by spraying, and then measuring the intensity of light reflected from a matrix of blocks on the unworn tire. The tire is then run for a short distance and the wear on the tire is assessed by measuring the intensity of light at each block compared to the intensity before the test run. The wear rate is clearly indicated by the changing levels of intensity of reflected light. Multiple colors or layers of paint are unnecessary. Tread wear can be measured with greater accuracy than achieved by other paint tests. The test run can be considerably shorter than test runs utilizing other methods.

9 Claims, 1 Drawing Sheet

Previous Method          New Method

METHOD FOR MEASURING TIRE WEAR USING INTENSITY OF REFLECTED LIGHT

FIELD OF THE INVENTION

This invention relates to tire manufacture. Specifically, this invention provides a high resolution, quantitative method for measuring tread wear on tires after very short test runs.

BACKGROUND OF THE INVENTION

Tread design for tires remains very much an art rather than a science. Predicting the wear rates on tire treads is uncertain, necessitating testing of new tread designs. The different sections on the tread wear at different rates, dependant upon the design of the tread, the composition of the tire, inflation, road conditions, usage, and the camber and toe-in of the tire. Since theoretical prediction is inexact, testing is required.

This testing of tire treads is time consuming and expensive: a full road test requires a long time to complete. It is customary to carry out relatively short usage tests, and then extrapolate the relatively small amount of wear induced to predict long term tread wear. The testing of the tire, usually on a vehicle, either in a laboratory setting, on a test track, or on actual roads, is referred to as running the tire, or a test run, or a run.

It is difficult to accurately measure small amounts of tread wear. The tread groove depth is often measured with a potentiometer probe. Lasers are known to be employed for more accurate measurement, but even when lasers are used, the runs must still wear away enough of the tread to provide accurate measurements. The result is that road tests are time consuming. Such tests may last for 5,000 kilometers. The after run testing is itself laborious and time consuming, Also, the method is inherently unable to determine uneven wear within a section of tread.

A different method of testing wear is to apply adhesive tape to the tire surface and examine the damage to the tape after a short run. However, the tape may lose adhesion and fall off the tire, and even if it does not, the test does not provide useful quantitative data.

An improved method of tire wear measurement (GB2232492A, 1990, Sumitomo Rubber Ind, Ltd.) is to paint the surface of the tire. In this method, a layer of rubber-based paint is applied to the tread surface of the tire and allowed to dry or cured to obtain a strong bond. A second layer of a different color of paint is then applied on top of the first layer and also dried or cured. This process is repeated until the tread surface has at least five coats of paint on it. The tire is then run for a short distance, typically 15–50 kilometers. The tread surface is then examined and the different colors of paint visible are noted to help determine the rate of wear on different sections of the tire. Exposure of deeper layers indicates greater wear.

This method has a number of disadvantages. The data gathered is essentially qualitative, not quantitative, and thus is difficult to analyze. Typically, a chart is drawn up, often by hand, with the different areas which display different colors indicated. In addition, it is necessary to run the tire for sufficient time to wear away enough paint to make the results unequivocal, i.e. 15–50 kilometers. At least five different colors of paint are required. The thickness of the layers may vary without the knowledge of the tester, corrupting the results. A considerable amount of time is spent allowing one coat of paint to dry or cure before applying the next coat. Vulcanization is required in order to guarantee a good bond of the paint to the tire. The results are low in resolution. Finally, the boundary between layers is usually not precise. Rather, the region displaying two different colors of paint is usually a slow blend from one color to the other, making accurate measurement difficult.

SUMMARY OF THE INVENTION

The present invention discloses an improved method of paint testing the wear on the tread surface of a tire.

In the method of the invention, a single layer of white paint (or paint of a color distinct from the tire color) is sprayed onto the tire's tread surface and allowed a short time to dry (5–10 minutes). The intensity of light reflected off of the tire is then measured at a matrix of selected blocks on the surface of the tire. After acquisition of these base values, the tire is run for a short distance (in the test data presented below, less than one kilometer) and the intensity of light reflected from the selected points is measured again. As the paint wears away to reveal the material of the tire below it, the reflectivity of the tread surface changes. The resulting changes in the intensity of the reflected light are measured after the run, showing the relative degree of wear at each location on the tire. The absolute intensities are measured, but the wear is indicated by changes in intensity. Both relative and absolute wear rates can be measured this way. Unlike previous paint tests, quantitative data is returned. Distribution of wear is measured to a high resolution, so wear within individual sections of tread. The resolution can also be increased in areas where eccentric or uneven wear is present or expected, simply by decreasing the size of the reflectivity measurement blocks. This measurement is difficult or impossible to make with previous methods. Less time is required to prepare the tire for testing as only one layer of paint need be applied, and less time is required because the white paint need not necessarily be vulcanized. Time is also saved because the test run can be very short, under a kilometer. This test method also produces highly repeatable data, as a result of the quantitative measurement of the data, the smaller number of variables, and the shortness of the test run. These improvements combine to reduce the cost and time of wear testing of tire treads, thus reducing the cost and increasing the quality of tires produced. These improvements also increase the value and quantity of the test data, thus also improving the quality of the tires produced.

In an alternative embodiment of the invention, the tire is first run for a short (~10 kilometers) conditioning period to remove mold lubricant and spue pips.

It is therefore one objective of the present invention to provide a method of measuring and predicting tire wear based upon a shorter test run of the tire.

It is another objective of the present invention to provide a method for producing highly repeatable tire wear data.

It is another objective of the present invention to provide a method for making a more exact, quantitative measure of tire wear.

It is another objective of the present invention to provide a method for making a higher resolution measure of tire wear.

It is another objective of the present invention to provide a method of making measurements of tire wear within the sections of tread of the tire.

It is yet another objective of the present invention to provide a method of preparing a tire for wear testing without need for multiple layers of paint.

It is yet another objective of the present invention to provide a method of preparing a tire for wear testing more quickly than is possible with known methods.

It is yet another objective of the present invention to provide a method of quickly testing tire wear without use of a rubber-based paint.

It is yet another objective of the present invention to provide a method to provide a method of preparing a tire for testing without need for vulcanization of multiple layers of paint.

DETAILED DESCRIPTION OF THE DRAWINGS

Figure 1:
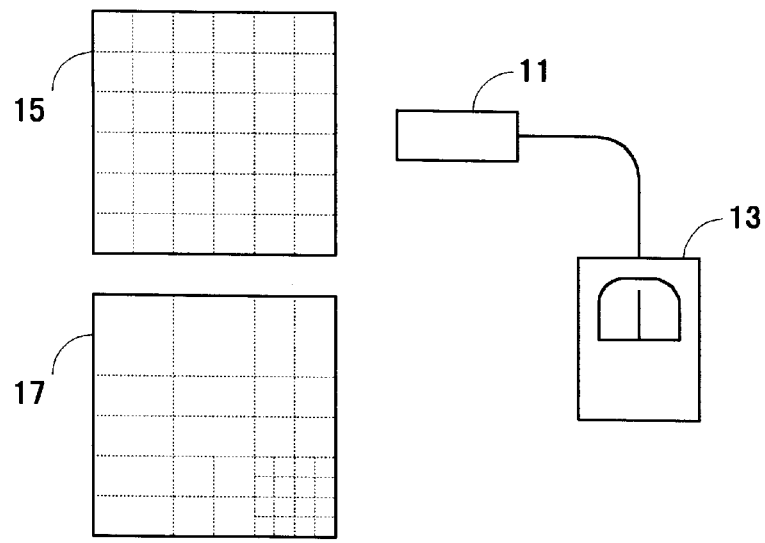
FIG. 1 is a simplified diagram of a system for measuring the intensity of reflected light according to the method of the present invention.

FIG. 1 is a simplified diagram of a system necessary for working the preferred embodiment of the invention. The system measures intensity of reflected light. Combined light source and probe 11 sends a signal to measuring device 13 indicating the strength of the reflected light.

In the practice of the preferred embodiment, a new tire is first conditioned by running it for 10 kilometers. White paint is sprayed onto the tread surface of the tire and allowed 5 or 10 minutes to dry. In an alternative embodiment, a better bond is formed by vulcanization. Even in that embodiment, time is saved as the vulcanization need be only enough to bond a single layer of paint.

The light source and probe 11 is then used to measure the intensity of reflected light in a grid of blocks 15 formed by the reflective paint on the tread surface of the tire. While a regular rectangular grid of reflective paint blocks having the same size (as illustrated by the upper pattern in FIG. 1) is possible and under some circumstances desirable, the preferred embodiment utilizes a grid of rectangular reflective paint blocks 17 having differing sizes (as illustrated by the lower pattern in FIG. 1). The pattern of blocks 17 is selected based on the pattern of the tire tread. Alternative embodiments having different arrangements and sizes are possible. These measurements provide a first set of light intensities. If the intensities indicate variations in the paint thickness sufficient to corrupt the results, the paint can be removed and reapplied, before the test run.

The tire is then test run for a preselected distance, 0.7 kilometers in the preferred embodiment. The distance is selected to provide partial wear of the paint on the tread surface.

After the run, the light intensities of the blocks are re-measured. The change in intensity provides a quantitative measure of the degree of tread wear suffered at that block.

In an alternative embodiment, a section of the tire's sidewall is painted as well, providing a standard of reference after the run. In another alternative embodiment, the intensity change is measured versus the painted section of sidewall, not in relative terms of individual blocks.

Reflective paint in this case means paint of different reflectivity from the tire material: usually white on black. It could easily be paint having lower reflectivity instead of higher.

Figure 2:
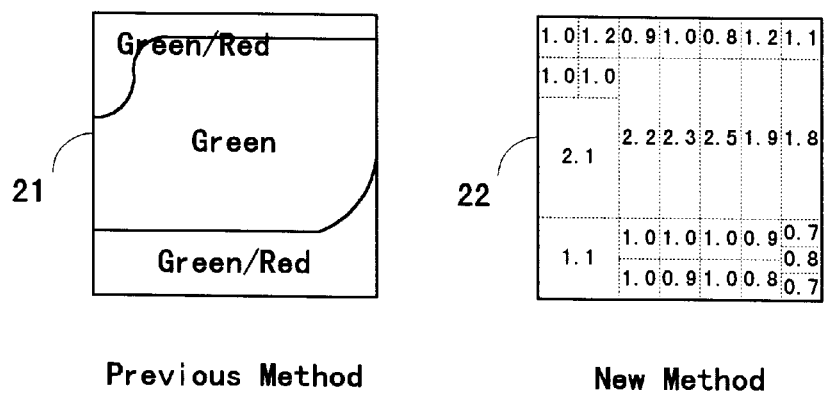
FIG. 2 is a diagram showing a comparison of the results obtained from testing a tire by the known method versus by the method of the present invention.

FIG. 2 shows the difference in test results obtained using the old, known method and the new method of the present invention. Results 21 were obtained using the old method and are non-quantitative and inexact. Both the resolution and exactness of the results 21 are low. The areas of highest wear show green paint, the areas of lower wear still retain a mixture of two colors.

Results 22 obtained using the new method are quantitative, high resolution, and exact. Each section of the results matrix has a numerical value assigned showing the change in light intensity. Note that within the areas shown as green by results 21, wear results 22 shows values ranging from 1.8 to 2.3, a substantial variation which would be invisible in results 21.

We claim:

1. A method of measuring tire wear on a tread surface, comprising the steps of:

applying a single layer of reflective paint to said tread surface of said tire, measuring an intensity of light reflected from said single layer of reflective paint while said single layer is on said tread surface of said tire to obtain a first light intensity value, then running said tire for a short distance to partially wear said single layer of reflective paint, then remeasuring said intensity of light reflected from said single layer of reflective paint while said single layer is on said tread surface of said tire to obtain a second light intensity value, and comparing said first light intensity value with said second light intensity value.

2. A method of measuring tire wear according to claim 1, wherein said step of measuring said intensity of light reflected from said single layer of reflective paint on said tread surface of said tire to obtain said first light intensity value further comprises measuring the intensity of light reflected from each of a plurality of selected blocks on said tread surface of said tire to obtain a plurality of pre-run light intensity values, said step of remeasuring light reflected from said tire surface of said tire to obtain a second light intensity value further comprises measuring the intensity of light reflected from each of said plurality of selected blocks on said tread surface of said tire to obtain a plurality of post-run light intensity values, and said step of comparing said first light intensity value with said second light intensity value to determine tire wear further comprises comparing each of said plurality of pre-run light intensity values with the corresponding one of said plurality of post-run intensity values.

3. The method of claim 2 wherein the measuring and remeasuring steps include deriving quantitative indications of the first and second light intensities and the comparing step includes comparing the quantitative indications of the first and second light intensities.

4. A method of measuring tire wear according to claim 1, further comprising the step of:

vulcanizing said single layer of reflective paint after the single layer has been applied to said tire and before the measuring and remeasuring steps are performed, the vulcanizing step being performed only for a period of time necessary to bond the single layer of reflective paint to said tread surface.

5. The method of claim 1 wherein the measuring and remeasuring steps are performed by directing light from a light source onto the single reflective layer.

6. The method of claim 5 wherein the light source and a probe for performing the measuring and remeasuring steps are included in a housing.

7. The method of claim 6 wherein the measuring and remeasuring steps include deriving quantitative indications of the first and second light intensities with the probe, and the comparing step includes comparing the quantitative indications of the first and second light intensities the probe derives.

8. The method of claim 1 wherein the measuring and remeasuring steps include deriving quantitative indications of the first and second light intensities and the comparing step includes comparing the quantitative indications of the first and second light intensities.

9. A method of measuring tire wear on a tread surface of a tire, comprising the steps of:

applying a single layer of reflective paint to said tread surface of said tire, applying a single layer of said reflective paint to a sidewall of said tire, running said tire for a short distance to partially wear said single layer of reflective paint, measuring an intensity of light reflected from said sidewall of said tire to obtain a first light intensity value, measuring said intensity of light reflected from said tread surface of said tire to obtain a second light intensity value, and comparing said first light intensity value with said second light intensity value.

* * * * *